(12) United States Patent
Petri

(10) Patent No.: US 7,549,132 B2
(45) Date of Patent: Jun. 16, 2009

(54) PRESENTING IDENTIFIERS AND STATES OF PROCESSES IN A STACKED CURSOR

(75) Inventor: John Edward Petri, Lewiston, MN (US)

(73) Assignee: International Business Machines Corporation, Armonk, NY (US)

( * ) Notice: Subject to any disclaimer, the term of this patent is extended or adjusted under 35 U.S.C. 154(b) by 418 days.

(21) Appl. No.: 11/380,738

(22) Filed: Apr. 28, 2006

(65) Prior Publication Data
US 2007/0256032 A1 Nov. 1, 2007

(51) Int. Cl.
G06F 3/00 (2006.01)
(52) U.S. Cl. ........................ 715/859; 715/772; 715/856; 715/861
(58) Field of Classification Search ................. 715/772, 715/856, 859, 861
See application file for complete search history.

(56) References Cited

U.S. PATENT DOCUMENTS

| 5,801,698 | A | | 9/1998 | Lection et al. | |
| 5,801,704 | A | * | 9/1998 | Oohara et al. ............... | 715/856 |
| 5,898,432 | A | * | 4/1999 | Pinard ........................ | 715/861 |
| 5,973,689 | A | * | 10/1999 | Gallery ....................... | 715/859 |
| 6,018,345 | A | * | 1/2000 | Berstis ....................... | 715/859 |
| 6,097,390 | A | | 8/2000 | Marks | |
| 6,100,871 | A | * | 8/2000 | Min ............................ | 715/861 |
| 6,493,002 | B1 | * | 12/2002 | Christensen ................ | 715/779 |
| 6,809,720 | B2 | * | 10/2004 | Malamud et al. ............ | 345/157 |
| 6,865,719 | B1 | * | 3/2005 | Nicholas, III ............... | 715/856 |
| 6,901,558 | B1 | * | 5/2005 | Andreas et al. ............. | 715/772 |
| 6,948,126 | B2 | * | 9/2005 | Malamud et al. ............ | 715/715 |
| 7,269,792 | B2 | * | 9/2007 | Consolatti et al. ........... | 715/749 |
| 2002/0140746 | A1 | * | 10/2002 | Gargi .......................... | 345/853 |
| 2003/0007007 | A1 | * | 1/2003 | Hinegardner et al. ....... | 345/769 |
| 2003/0117432 | A1 | * | 6/2003 | Kautto-Kiovula et al. ... | 345/735 |
| 2005/0088410 | A1 | | 4/2005 | Chaudhri | |
| 2005/0091614 | A1 | * | 4/2005 | Wasko et al. ................ | 715/861 |
| 2005/0097480 | A1 | * | 5/2005 | Care .......................... | 715/859 |
| 2005/0120306 | A1 | * | 6/2005 | Klassen et al. ............. | 715/765 |
| 2006/0010401 | A1 | * | 1/2006 | Davidovich et al. ......... | 715/859 |
| 2006/0036971 | A1 | * | 2/2006 | Mendel et al. .............. | 715/856 |
| 2006/0085758 | A1 | * | 4/2006 | Backus ....................... | 715/772 |
| 2007/0038963 | A1 | * | 2/2007 | Moore ........................ | 715/859 |
| 2007/0143710 | A1 | * | 6/2007 | Hayman ..................... | 715/837 |
| 2007/0143713 | A1 | * | 6/2007 | Hosoki et al. ............... | 715/859 |

* cited by examiner

Primary Examiner—Sy D Luu
(74) Attorney, Agent, or Firm—Owen J. Gamon

(57) ABSTRACT

In an embodiment, identifiers and states of processes are displayed in a stacked cursor, which is moved in response to movement of a pointing device. The display of the identifiers and the states is customized based on a presentation type associated with each of the processes. If a time threshold associated with the process expires, the identifier of the process and the state are removed from the stacked cursor. In various embodiments, customizing the display of the states and the identifiers may include displaying the state and/or the identifier in text forms, icon forms, and/or colors indicated by the presentation type and/or presenting a sound indicated by the presentation type in response to a change of the state. In this way, a user can determine the states of multiple processes without diverting the user's attention from the stacked cursor.

19 Claims, 4 Drawing Sheets

| PROCESS DATA | | | | |
|---|---|---|---|---|
| PROCESS ID | STATE | PRESENTATION TYPE | TIME THRESHOLD | |
| WORD PROCESSOR | CURRENT | TEXT, ICON | INDEFINITE | 305 |
| VIDEO | LOADING | TEXT, ICON | 1 MINUTE | 310 |
| FILE TRANSFER | 24% | TEXT, SOUND | 20 SECONDS | 315 |
| EMAIL | READY | TEXT | INDEFINITE | 320 |
| INSTANT MESSAGING | WAITING | COLOR | 2 MINUTES | 325 |
| BROWSER | LOADING | ICON | 20 SECONDS | 330 |

FIG. 3

PRESENTING IDENTIFIERS AND STATES OF PROCESSES IN A STACKED CURSOR

FIELD

An embodiment of the invention generally relates to computers. In particular, an embodiment of the invention generally relates to a stacked cursor in a graphical user interface for a computer.

BACKGROUND

The development of the EDVAC computer system of 1948 is often cited as the beginning of the computer era. Since that time, computer systems have evolved into extremely sophisticated devices, and computer systems may be found in many different settings. One of the most important developments in making computers not only more powerful, but easier to use, was the development of sophisticated user interfaces, such as a Graphical User Interface (GUI).

A graphical user interface uses visual representations of common items to allow a user to operate a computer system. In most GUI-based systems, various windows, icons, symbols, menus, etc. are manipulated or activated by a computer user via a pointing device (e.g., a keyboard, mouse, trackball, touchpad, trackpad, or speech recognition device), which allows the user to give instructions to the computer. The movement of the pointing device is usually translated to the movement of an animated arrow or cursor, displayed on the computer screen. By moving the pointing device, the user can position the cursor at various locations on the computer screen. Then, by activating a button on the pointing device, the user can invoke various commands and options and input data using the graphical user interface. Thus, the user's focus of attention is often at or near the location of the graphical user interface that is occupied by the arrow or cursor.

Most graphical user interfaces make extensive use of windows. A window is usually, but not always, a rectangular portion of the display on a computer monitor that presents its contents seemingly independent from the rest of the screen. A window is typically manipulated by (1) opening and closing the window, e.g., by selecting an icon via the pointing device to start a program, (2) moving the window to any area of the screen by dragging (e.g., positioning the pointer over the window and moving the pointing device with a button held down), (3) repositioning the window, so that the window appears to be behind or in front of other windows or objects on the screen, (4) adjusting the size (i.e., horizontal and/or vertical dimensions) and (5) scrolling to any section of the window contents, e.g., by using scroll bars along the bottom and right edges of the window, or by using a mouse wheel or keyboard commands.

The size of most windows can be adjusted over a wide range including full screen, a fraction of the screen, and more than the full screen. In the latter case, the desired section of the window can be viewed by moving the window to expose it. Windows can also be minimized, which results in their being replaced by an icon and/or their name, usually in a taskbar, which is often disposed along the bottom of the screen, without actually closing the underlying application program.

Another feature of a windowing GUI is the ability for multiple windows to be open simultaneously. This is particularly valuable in a multitasking environment, i.e., an operating system in which multiple programs can run seemingly simultaneously and without interfering with each other. Each window can display a different application or data generated by a different application, each window can display different files that have been opened or created with a single application, or a window can display or represent data associated with multiple applications.

Multiple open windows can be arranged with respect to each other in a variety of ways. They can be arranged so that they are contiguous and do not overlap (tiled windows) or so they do overlap (overlaid windows). Overlaid windows resemble a stack of documents lying on top of one another, with only the upper-most window displayed in full. Any window can be moved to the top of the stack and made the active window (i.e., ready for receiving user input) by positioning the pointer in any portion of it that is visible and clicking a mouse button. When applications are launched, they may open in a single window or multiple windows.

Various type of windows exist, and their functions and appearances can vary substantially. For example, child windows are windows that are opened either automatically or as a result of some user activity when using a parent window. They can range in functionality from the very simple to the full complement of controls. Message windows, also referred to as dialog boxes or pop-up messages, are a type of child window. A dialog box is usually a small and very basic window that is opened by a program or by the operating system to provide information to the user and/or obtain information (or at least a response) from the user, including setting options or issuing commands.

Because the display screen may contain so many windows, and because some windows may pop up or open unexpectedly in response to asynchronous events, users are often deluged with an overwhelming assortment of attention-demanding windows, popups, and status or state indicators. With many of these windows, the user waits for a change to be made in the state of a window, and this change in state indicates that further action needs to be taken, or an operation is complete, so action is now allowed to be taken. This paradigm of waiting for a state change and then taking action is prevalent in applications such as email, instant messaging (IM), programming output, server consoles, dynamic websites, RSS (Rich Site Summary) feeds, and many others. The result is that users frequently toggle between windows in an attempt to determine the current state of various applications, which hampers the users' productivity.

Some applications attempt to aid the user by displaying an icon in the window or taskbar or by blinking or highlighting data in the window, in order to indicate a change of state. Unfortunately, the user still needs to toggle to the window and/or view the portion of the window or taskbar with the icon to determine the state. Even if the window whose state has changed is currently open, the user's attention has likely shifted to some other portion of the window, so that the user is not looking at the portion where the state change is indicated.

Other applications change the display of a cursor to a different icon (e.g., an hourglass icon or other "wait cursor") when an application is busy and unable to accept input. But, a wait cursor is not helpful when multiple applications are executing simultaneously because a wait cursor does not indicate which of the multiple executing applications is waiting.

Still other applications change the display of a cursor in response to movement of the cursor over a window to reflect the state of the application in that window. Unfortunately, this technique only displays state for one application at a time and requires the user to proactively move the cursor over various windows to check their state at a time when the user's attention is elsewhere.

Thus, a better technique is needed for determining the states of multiple windows representing applications that are operating simultaneously.

SUMMARY

A method, apparatus, system, and signal-bearing medium are provided. In an embodiment, identifiers and states of processes are displayed in a stacked cursor, which is moved in response to movement of a pointing device. The display of the identifiers and the states is customized based on a presentation type associated with each of the processes. If a time threshold associated with the process expires, the identifier of the process and the state are removed from the stacked cursor. In various embodiments, customizing the display of the states and the identifiers may include displaying the state and/or the identifier in text forms, icon forms, and/or colors indicated by the presentation type and/or presenting a sound indicated by the presentation type in response to a change of the state. In this way, a user can determine the states of multiple processes without diverting the user's attention from the stacked cursor.

BRIEF DESCRIPTION OF THE DRAWINGS

FIG. 3 depicts a block diagram of an example data structure for process data, according to an embodiment of the invention.

DETAILED DESCRIPTION

In an embodiment, a controller receives identifiers and states of processes and displays the identifiers and states in a stacked cursor on a display screen. In various embodiments, the controller moves the stacked cursor on the display screen in response to movement of a pointing device or in response to movement of a cursor, which moves in response to the pointing device. The controller customizes the display of the identifiers and the states based on a presentation type associated with each of the processes. In various embodiments, customizing the display may include displaying the state and/or the identifier in text forms, icon forms, and/or colors indicated by the presentation type and/or presenting a sound indicated by the presentation type in response to a change of the state. If a time threshold associated with the process expires and the associated process is ready, the controller removes the identifier and state from the stacked cursor. In this way, a user can determine the states of multiple processes without diverting the user's attention from the stacked cursor.

Figure 1:
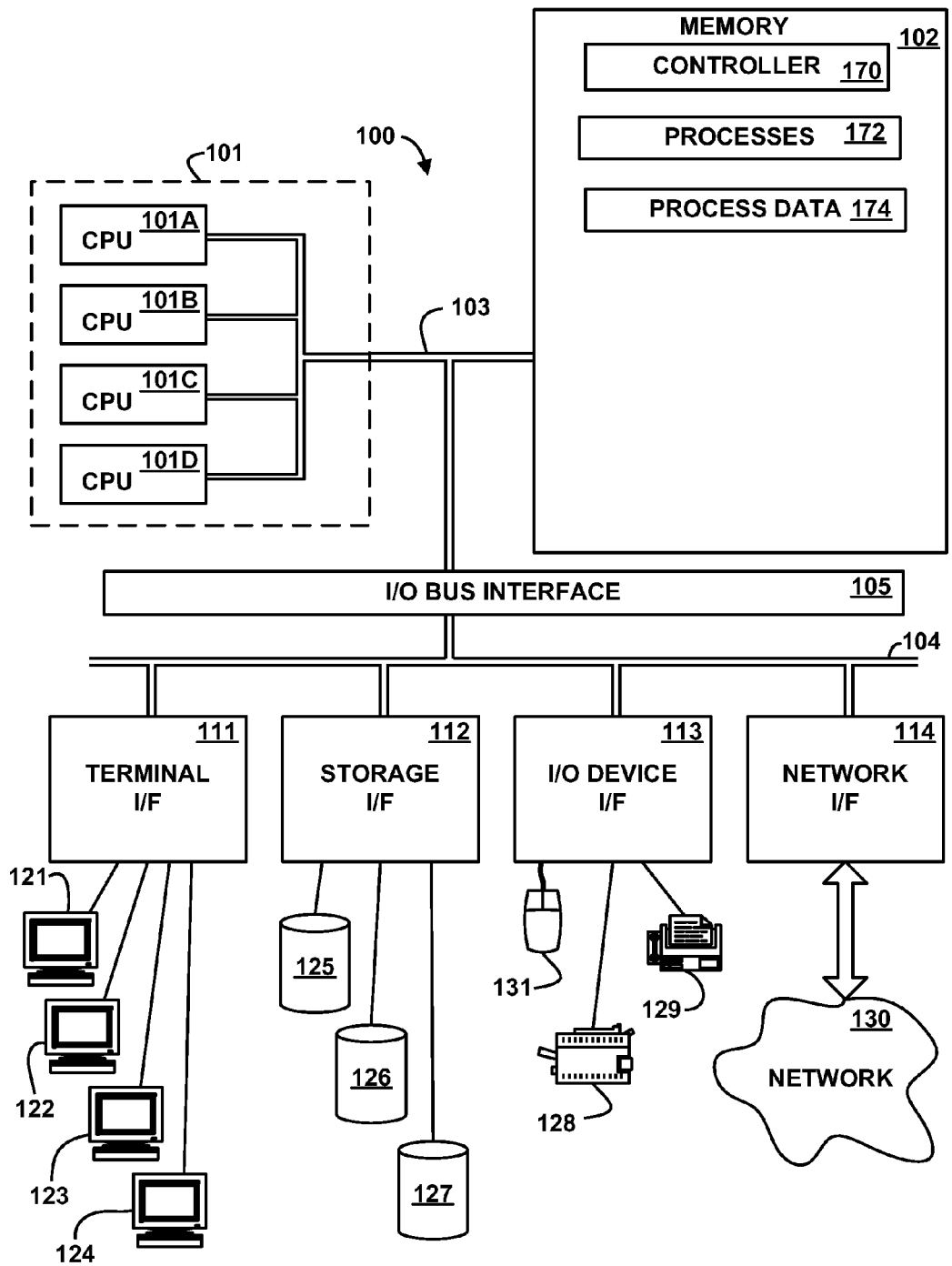
FIG. 1 depicts a block diagram of an example system for implementing an embodiment of the invention.

Referring to the Drawings, wherein like numbers denote like parts throughout the several views, FIG. 1 depicts a high-level block diagram representation of a computer system 100 connected to a network 130, according to an embodiment of the present invention. The major components of the computer system 100 include one or more processors 101, a main memory 102, a terminal interface 111, a storage interface 112, an I/O (Input/Output) device interface 113, and communications/network interfaces 114, all of which are coupled for inter-component communication via a memory bus 103, an I/O bus 104, and an I/O bus interface unit 105.

The computer system 100 contains one or more general-purpose programmable central processing units (CPUs) 101A, 101B, 101C, and 101D, herein generically referred to as the processor 101. In an embodiment, the computer system 100 contains multiple processors typical of a relatively large system; however, in another embodiment the computer system 100 may alternatively be a single CPU system. Each processor 101 executes instructions stored in the main memory 102 and may include one or more levels of on-board cache.

The main memory 102 is a random-access semiconductor memory for storing data and programs. The main memory 102 is conceptually a single monolithic entity, but in other embodiments, the main memory 102 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may further be distributed and associated with different CPUs or sets of CPUs, as is known in any of various so-called non-uniform memory access (NUMA) computer architectures.

The memory 102 includes a controller 170, processes 172, and process data 174. Although the controller 170, the processes 172, and the process data 174 are illustrated as being contained within the memory 102 in the computer system 100, in other embodiments some or all of them may be on different computer systems and may be accessed remotely, e.g., via the network 130. The computer system 100 may use virtual addressing mechanisms that allow the programs of the computer system 100 to behave as if they only have access to a large, single storage entity instead of access to multiple, smaller storage entities. Thus, while the controller 170, the processes 172, and the process data 174 are all illustrated as being contained within the memory 102 in the computer system 100, these elements are not necessarily all completely contained in the same storage device at the same time. Further, although the controller 170, the processes 172, and the process data 174 are illustrated as being separate entities, in other embodiments some of them, portions of some of them, or all of them may be packaged together.

The controller 170 displays a user interface of windows associated with the processes 172 and a stacked cursor that represents the states of the processes 172 via the process data 174. The user interface is further described below with reference to FIG. 2. In an embodiment, the controller 170 includes instructions capable of executing on the processor 101 or statements capable of being interpreted by instructions executing on the processor 101 to perform the functions as further described below with reference to FIGS. 4 and 5. In another embodiment, the controller 170 may be implemented in microcode. In another embodiment, the controller 170 may be implemented in hardware via logic gates and/or other appropriate hardware techniques in lieu of or in addition to a processor-based system.

The processes 172 may include instructions capable of executing on the processor 101 or statements capable of being interpreted by instructions executing on the processor 101. In various embodiments, the processes 172 may be user applications, third-party applications, operating systems, threads, methods, procedures, functions, or any combination, multiple, or portion thereof. The process data 174 describes the processes 172 and their states. The process data 174 is further described below with reference to FIG. 3.

The memory bus 103 provides a data communication path for transferring data among the processors 101, the main memory 102, and the I/O bus interface unit 105. The I/O bus interface unit 105 is further coupled to the system I/O bus 104 for transferring data to and from the various I/O units. The I/O bus interface unit 105 communicates with multiple I/O interface units 111, 112, 113, and 114, which are also known as I/O processors (IOPs) or I/O adapters (IOAs), through the system I/O bus 104. The system I/O bus 104 may be, e.g., an industry standard PCI (Peripheral Component Interconnect) bus, or any other appropriate bus technology. The I/O interface units support communication with a variety of storage and I/O devices. For example, the terminal interface unit 111 supports the attachment of one or more user terminals 121, 122, 123, and 124.

The storage interface unit 112 supports the attachment of one or more direct access storage devices (DASD) 125, 126, and 127, which are typically rotating magnetic disk drive storage devices, although they could alternatively be other devices, including arrays of disk drives configured to appear as a single large storage device to a host. The contents of the DASD 125, 126, and 127 may be loaded from and stored to the memory 102 as needed. The storage interface unit 112 may also support other types of devices, such as a diskette device, a tape device, an optical device, or any other type of storage device.

The I/O device interface 113 provides an interface to any of various other input/output devices or devices of other types. Three such devices, the printer 128, the fax machine 129, and the pointing device 131 are shown in the exemplary embodiment of FIG. 1, but in other embodiment many other such devices may exist, which may be of differing types. In various embodiments, the pointing device 131 may be a keyboard, mouse, trackball, touchpad, trackpad, speech recognition device, or any other pointing device that allows the user to give instructions to the computer 100. The movement of the pointing device 131 is translated to the movement of an arrow or cursor displayed on the display screen of the user terminals 121, 122, 123, and 124. By moving the pointing device 131, the user can position the arrow or cursor at various locations on the display screen. Then, by activating a button on the pointing device, the user can invoke various commands and options and select objects on the graphical user interface.

The network interface 114 provides one or more communications paths from the computer system 100 to other digital devices and computer systems; such paths may include, e.g., one or more networks 130. In various embodiments, the network interface 114 may be implemented via a modem, a LAN (Local Area Network) card, a virtual LAN card, or any other appropriate network interface or combination of network interfaces.

Although the memory bus 103 is shown in FIG. 1 as a relatively simple, single bus structure providing a direct communication path among the processors 101, the main memory 102, and the I/O bus interface 105, in fact the memory bus 103 may comprise multiple different buses or communication paths, which may be arranged in any of various forms, such as point-to-point links in hierarchical, star or web configurations, multiple hierarchical buses, parallel and redundant paths, etc. Furthermore, while the I/O bus interface 105 and the I/O bus 104 are shown as single respective units, the computer system 100 may in fact contain multiple I/O bus interface units 105 and/or multiple I/O buses 104. While multiple I/O interface units are shown, which separate the system I/O bus 104 from various communications paths running to the various I/O devices, in other embodiments some or all of the I/O devices are connected directly to one or more system I/O buses.

The computer system 100 depicted in FIG. 1 has multiple attached terminals 121, 122, 123, and 124, such as might be typical of a multi-user "mainframe" computer system. Typically, in such a case the actual number of attached devices is greater than those shown in FIG. 1, although the present invention is not limited to systems of any particular size. The computer system 100 may alternatively be a single-user system, typically containing only a single user display and keyboard input, or might be a server or similar device which has little or no direct user interface, but receives requests from other computer systems (clients). In other embodiments, the computer system 100 may be implemented as a firewall, router, Internet Service Provider (ISP), personal computer, portable computer, laptop or notebook computer, PDA (Personal Digital Assistant), tablet computer, pocket computer, telephone, pager, automobile, teleconferencing system, appliance, or any other appropriate type of electronic device.

The network 130 may be any suitable network or combination of networks and may support any appropriate protocol suitable for communication of data and/or code to/from the computer system 100. In various embodiments, the network 130 may represent a storage device or a combination of storage devices, either connected directly or indirectly to the computer system 100. In an embodiment, the network 130 may support Infiniband. In another embodiment, the network 130 may support wireless communications. In another embodiment, the network 130 may support hard-wired communications, such as a telephone line or cable. In another embodiment, the network 130 may support the Ethernet IEEE (Institute of Electrical and Electronics Engineers) 802.3x specification. In another embodiment, the network 130 may be the Internet and may support IP (Internet Protocol). In another embodiment, the network 130 may be a local area network (LAN) or a wide area network (WAN). In another embodiment, the network 130 may be a hotspot service provider network. In another embodiment, the network 130 may be an intranet. In another embodiment, the network 130 may be a GPRS (General Packet Radio Service) network. In another embodiment, the network 130 may be a FRS (Family Radio Service) network. In another embodiment, the network 130 may be any appropriate cellular data network or cell-based radio network technology. In another embodiment, the network 130 may be an IEEE 802.11B wireless network. In still another embodiment, the network 130 may be any suitable network or combination of networks. Although one network 130 is shown, in other embodiments any number of networks (of the same or different types) may be present.

It should be understood that FIG. 1 is intended to depict the representative major components of the computer system 100 and the network 130 at a high level, that individual components may have greater complexity than represented in FIG. 1, that components other than, fewer than, or in addition to those shown in FIG. 1 may be present, and that the number, type, and configuration of such components may vary. Several particular examples of such additional complexity or additional variations are disclosed herein; it being understood that these are by way of example only and are not necessarily the only such variations.

The various software components illustrated in FIG. 1 and implementing various embodiments of the invention may be implemented in a number of manners, including using various computer software applications, routines, components, programs, objects, modules, data structures, etc., referred to hereinafter as "computer programs," or simply "programs."

The computer programs typically comprise one or more instructions that are resident at various times in various memory and storage devices in the computer system 100, and that, when read and executed by one or more processors in the computer system 100, cause the computer system 100 to perform the steps necessary to execute steps or elements embodying the various aspects of an embodiment of the invention.

Moreover, while embodiments of the invention have and hereinafter will be described in the context of fully functioning computer systems, the various embodiments of the invention are capable of being distributed as a program product in a variety of forms, and the invention applies equally regardless of the particular type of signal-bearing medium used to actually carry out the distribution. The programs defining the functions of this embodiment may be delivered to the computer system 100 via a variety of tangible signal-bearing media that may be operatively or communicatively connected (directly or indirectly) to the processor 101. The signal-bearing media may include, but are not limited to:

(1) information permanently stored on a non-rewriteable storage medium, e.g., a read-only memory device attached to or within a computer system, such as a CD-ROM readable by a CD-ROM drive;

(2) alterable information stored on a rewriteable storage medium, e.g., a hard disk drive (e.g., DASD 125, 126, or 127), CD-RW, or diskette; or (3) information conveyed to the computer system 100 by a communications medium, such as through a computer or a telephone network, e.g., the network 130.

Such tangible signal-bearing media, when encoded with or carrying computer-readable and executable instructions that direct the functions of the present invention, represent embodiments of the present invention.

Embodiments of the present invention may also be delivered as part of a service engagement with a client corporation, nonprofit organization, government entity, internal organizational structure, or the like. Aspects of these embodiments may include configuring a computer system to perform, and deploying software systems and web services that implement, some or all of the methods described herein. Aspects of these embodiments may also include analyzing the client company, creating recommendations responsive to the analysis, generating software to implement portions of the recommendations, integrating the software into existing processes and infrastructure, metering use of the methods and systems described herein, allocating expenses to users, and billing users for their use of these methods and systems.

In addition, various programs described hereinafter may be identified based upon the application for which they are implemented in a specific embodiment of the invention. But, any particular program nomenclature that follows is used merely for convenience, and thus embodiments of the invention should not be limited to use solely in any specific application identified and/or implied by such nomenclature.

The exemplary environments illustrated in FIG. 1 are not intended to limit the present invention. Indeed, other alternative hardware and/or software environments may be used without departing from the scope of the invention.

Figure 2:
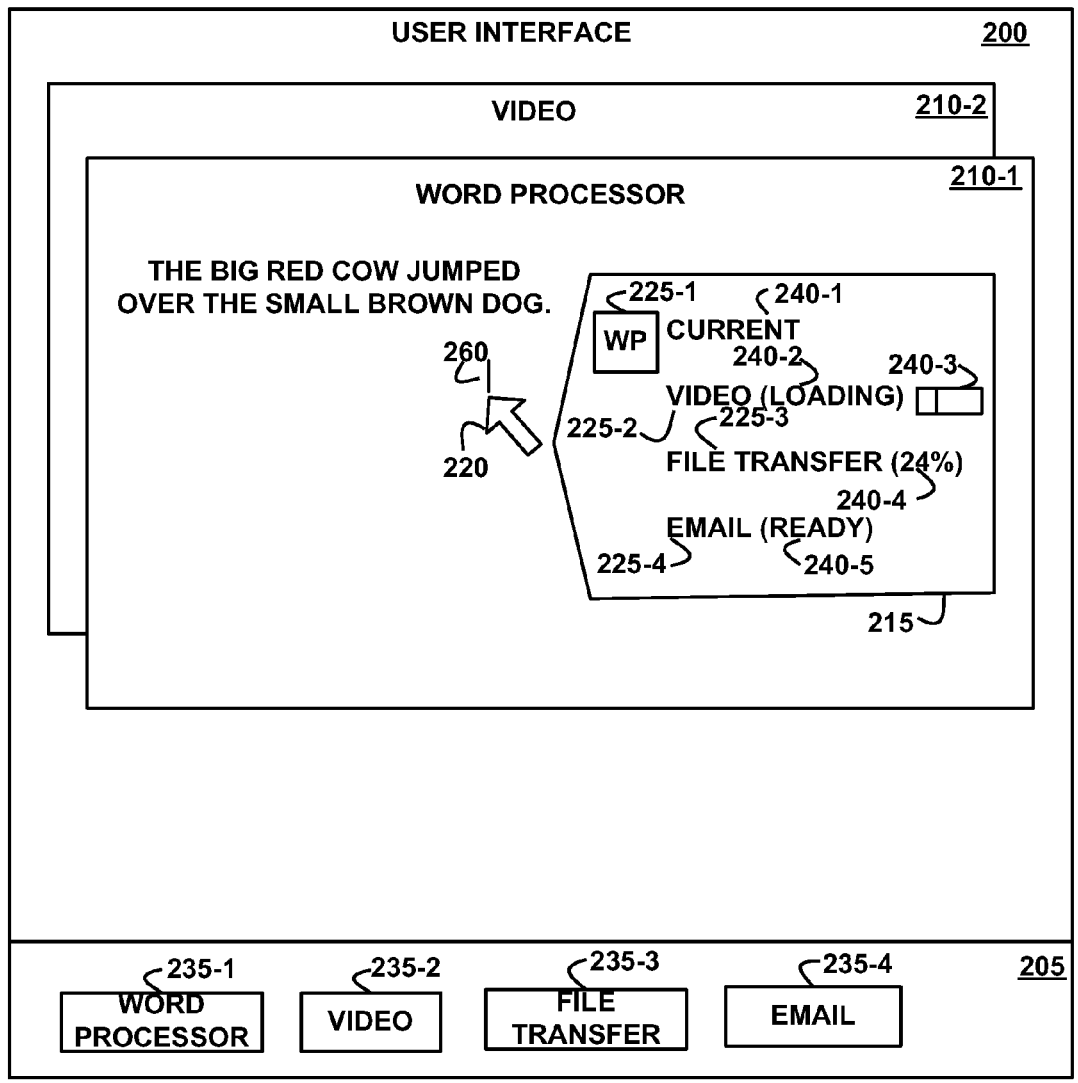
FIG. 2 depicts a block diagram of an example user interface for a stacked cursor, according to an embodiment of the invention.

FIG. 2 depicts a block diagram of an example user interface 200, according to an embodiment of the invention. The user interface 200 is displayed on a display screen, such as one or more of the terminals 121, 122, 123, and/or 124. The user interface 200 includes any number of windows, such as the windows 210-1 and 210-2, which are associated with or display data generated by one or more of the processes 172.

The window 210-1 is in the foreground of the user interface 200, meaning that the window 210-1 is not overlapped by another window. The window 210-1 includes a selection point 260 associated with the cursor 220 is in the window 210-1. The selection point 260 of the cursor 220 is the location in the user interface 200 at which the next data received from a keyboard or other data input device is entered if selected by the pointing device 131 (e.g. by depressing a button on the pointing device). In an embodiment, the selection point 260 may be moved separately from the cursor 220, e.g., via a different pointing device, such as via a keyboard as opposed to a mouse, and selecting a button on the mouse causes the controller 170 to move the selection point 260 to the current location of the pointing device 131. If the cursor 220 is positioned at a selection point 260 in the user interface 200 where data is not allowed to be entered, then an object (if any) at the selection point 260 may be selected by the controller 170 in response to an operation of the pointing device 131, e.g., by depressing a button.

The window 210-2 is partially overlapped by the window 210-1, so that the contents of the window 210-2 are not fully displayed. Although the window 210-2 is partially overlapped, the process 172 associated with the window 210-2 is still executing on the processor 101.

The user interface 200 also includes a taskbar 205, which includes icons 235-1, 235-2, 235-3, and 235-4, which represent the currently executing processes 172. The icon 235-1 represents the process 172 associated with the window 210-1, and the icon 235-2 represents the process 172 associated with the window 210-2. Windows associated with the icons 235-3 and 235-4 are minimized, meaning that although their respective associated processes 172 are executing on the processor 101, their windows exist on the user interface 200 only as the minimized icons 235-3 and 235-4, so that data generated by or associated with their processes 172 is not visible.

The stacked cursor 215 includes process identifiers 225-1, 225-2, 225-3, and 225-4. The controller 170 displays the process identifier 225-1 in icon form and displays the process identifiers 225-2, 225-3, and 225-4 in text form. The stacked cursor 215 further includes states 240-1, 240-2, 240-3, 240-4, and 250-5. The controller 170 displays the states 240-1, 240-2, 240-4, and 250-5 in text form and displays the state 240-3 in icon form. The stacked cursor 215 includes process identifiers and states for not only the current process window 210-1 that is in the foreground and with which the user is currently interacting (which includes the selection point 260), but also the window 210-2 that is in the background of the user interface 200 and is partially hidden or overlapped and the processes 172 whose associated windows are minimized as icons 235-3 and 235-4. For example, the process identifier 225-1 and the state 240-1 are associated with the window 210-1, the processor identifier 225-2 and states 240-2 and 240-3 are associated with the window 210-2, the processor identifier 225-3 and state 240-4 are associated with the minimized window icon 235-3, and the process identifier 225-4 and the state 240-5 are associated with the minimized window icon 235-4. The state icon 240-3 represents an indicator of the amount (relative or absolute) of progress that the associated process 172 has attained toward completing a request or operation.

FIG. 3 depicts a block diagram of an example data structure for the process data 174, according to an embodiment of the invention. The process data 174 includes records 305, 310, 315, 320, 325, and 330, each of which includes an example process identifier field 340, a state field 345, a presentation type field 350, and a time threshold field 355.

In various embodiments, the process identifier field 340 identifies a process 172, identifies a window in which data associated with or generated by the process 172 is displayed, or identifies any portion, combination, or multiple thereof. The state field 345 indicates a state or status of the process 340 or of an operation that the process 340 is performing. In various embodiments, the state 345 may indicate an error or abnormal condition that the processor 340 has encountered or may indicate a normal or expected event or condition. For example, the state 345 include an indication that the process 340 is associated with the current window (the window in the foreground), an indication that the process 340 is loading or initializing itself or transferring data, an indication of an amount of data that has been written, read, or transferred or remains to be written, read, or transferred (in either relative or absolute terms), an indication that the process 340 is ready to accept input, and indication that the most-recent operation is done or completed, an indication that a file, database, container, or directory is open or closed, an indication that the process 340 is waiting for a message from another process or is waiting for a task, action, or operation of another process or device to complete. In other embodiments, any appropriate state may be used.

The presentation type field 350 indicates the format or type of the display of the process identifier 340 and the state 345 on the stacked cursor 215. The controller 170 customizes presentation of the process identifier 340 and the state 345 based on the presentation type 350. For example, in various embodiments, the presentation type 350 may indicate that the process identifier 340 and/or the state 345 are to be displayed in text form or icon form and may specify an address or file name and optional path of the icon to be displayed. The presentation type 350 may further indicate a color, font, or size of the processor identifier 340 and/or state 345 and may indicate a sound to be played in response to the state 345 changing.

The time threshold field 355 indicates the amount of time that the corresponding process identifier 340 and state 345 are to remain displayed on the stacked cursor 215.

Figure 4:
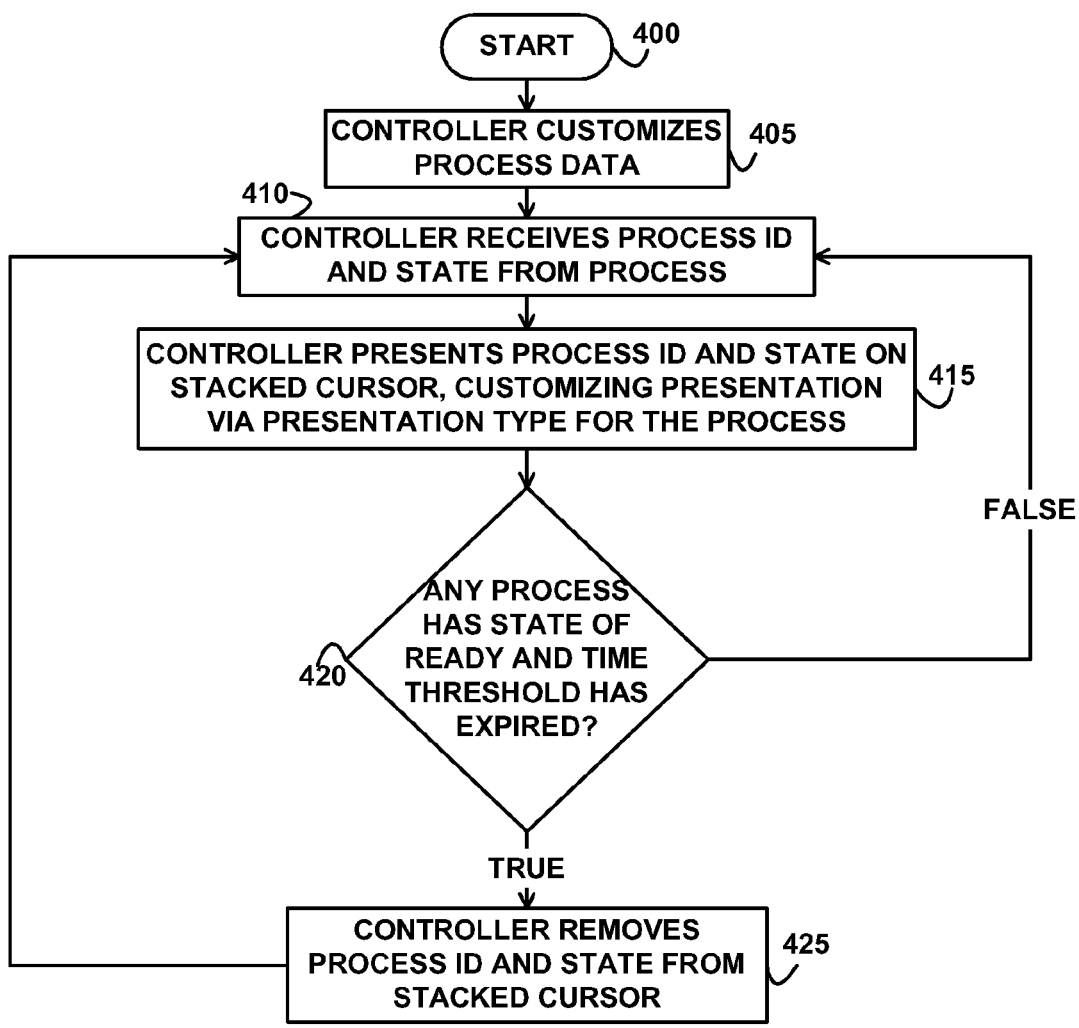
FIG. 4 depicts a flowchart of example processing for displaying a stacked cursor, according to an embodiment of the invention.

FIG. 4 depicts a flowchart of example processing for displaying a stacked cursor, according to an embodiment of the invention. Control begins at block 400. Control then continues to block 405 where the controller 170 customizes the process data 174. For example, the controller 170 may receive the various presentation types and time thresholds from a user interface or programmatically and store them in the process data 174.

Control then continues to block 410 where the controller 170 receives the process identifier 340 and state 345 from one or more of the processes 172 and stores them in the process data 174. Control then continues to block 415 where the controller 170 presents the process identifiers 340 and their associated states 345 on the stacked cursor 215. The controller 170 customizes the display of the process identifiers 340 and their associated states 345 on the stacked cursor 215 based on the respective presentation types 350 associated with the processes 172. For example, the controller 170 displays the state 345 in the stacked cursor 215 in a text form if indicated by the respective presentation type 350, displays the state 345 in the stacked cursor 215 in an icon form if indicated by the respective presentation type 350, displays the process identifier 340 in the stacked cursor 215 in a text form if indicated by the respective presentation type 350, displays the process identifier 340 in the stacked cursor 215 in an icon form if indicated by the respective presentation type 350, or displays the process identifier 340 and the state 345 in the stacked cursor 215 in a color if indicated by the respective presentation type 350. The controller 170 may present a sound (e.g., via a speaker) if indicated by the respective presentation type 350 in response to a change of the state 345. In other embodiments, the controller 170 may change the color and/or style (e.g., bold, italics, or font) and/or icon of the identifier 340 and/or the state 345 in response to a change of the state 345.

Control then continues to block 420 where the controller 170 determines whether any process 172 has a state 345 indicating that the process 172 is ready to accept a request or input and the time threshold 355 associated with that process 172 has expired. If the determination at block 420 is true, then a process 172 has a state 345 indicating that the process 172 is ready to accept a request or input and the time threshold 355 associated with that process 172 has expired, so control continues to block 425 where the controller 170 removes the process identifier 340 and the associated state 345 from the stacked cursor 215. Thus, the controller 170 removes the process identifier 340 and the associated state 345 from the stacked cursor 215 if the time threshold 355 associated with the respective process 172 expires. Control then returns to block 410, where the controller 170 receives another process identifier 340 and associated state 345, as previously described above.

If the determination at block 420 is false, then a process 172 does not have a state 345 indicating that the process 172 is ready with an expired time threshold 355, so control returns to block 410 where the controller 170 receives another process identifier 340 and associated state 345, as previously described above.

Figure 5:
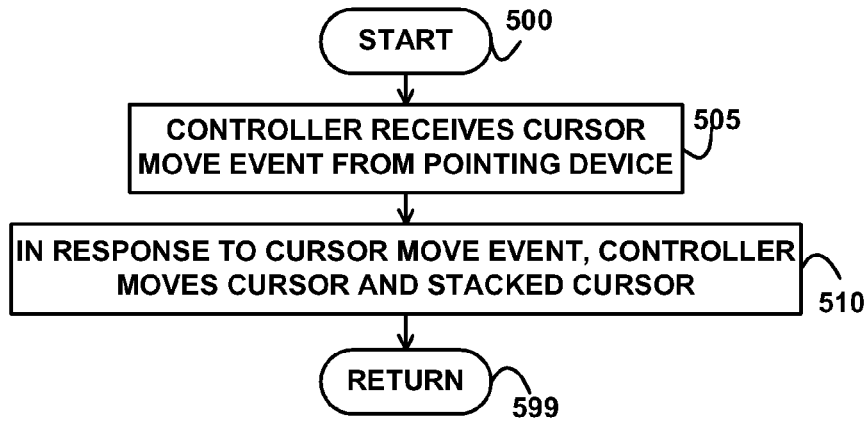
FIG. 5 depicts a flowchart of example processing for moving a stacked cursor, according to an embodiment of the invention.

FIG. 5 depicts a flowchart of example processing for moving a stacked cursor 215, according to an embodiment of the invention. Control begins at block 500. Control then continues to block 505 where the controller 170 receives a cursor move event from the pointing device. The cursor move event indicates that the pointing device 131 has moved, and the cursor move event may include a direction and an amount of the movement. Control then continues to block 510 where, in response to the cursor move event, the controller 170 moves the cursor 220 and the stacked cursor 215 by an amount proportional to the movement of the pointing device 131 and in a direction corresponding to the movement of the pointing device 131. In an embodiment, the cursor 220 moves in response to the movement of the pointing device 131, and the controller 170 moves the stacked cursor 215 by an amount proportional to the movement of the cursor 220 and in a direction associated with the movement of the cursor 220, so that the stacked cursor 215 moves in concert with the cursor 220. Control then continues to block 599 where the logic of FIG. 5 returns.

In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of records, entries, or organizations of data may be used. In addition, any data may be combined with logic, so that a separate data structure is not necessary. The previous detailed description is, therefore, not to be taken in a limiting sense, and the scope of the present invention is defined only by the appended claims.

In the previous description, numerous specific details were set forth to provide a thorough understanding of the invention. But, the invention may be practiced without these specific details. In other instances, well-known circuits, structures, and techniques have not been shown in detail in order not to obscure the invention.

What is claimed is:

1. A method comprising:
   receiving a plurality of states associated with a plurality of respective processes;
   displaying a plurality of identifiers of the respective processes and the plurality of states in a stacked cursor;
   customizing the displaying based on a presentation type associated with each of the processes;
   moving the stacked cursor in response to movement of a pointing device; and
   removing the identifier and the state from the stacked cursor if a time threshold associated with the respective process expires and the state indicates that the respective process is ready.

2. The method of claim 1, wherein the customizing further comprises:
   displaying the state in the stacked cursor in a text form indicated by the respective presentation type.

3. The method of claim 1, wherein the customizing further comprises:
   displaying the state in the stacked cursor in an icon form indicated by the respective presentation type.

4. The method of claim 1, wherein the customizing further comprises:
   displaying the identifier in the stacked cursor in a text form indicated by the respective presentation type.

5. The method of claim 1, wherein the customizing further comprises:
   displaying the identifier in the stacked cursor in an icon form indicated by the respective presentation type.

6. The method of claim 1, wherein the customizing further comprises:
   displaying the identifier and the state in the stacked cursor in a color indicated by the respective presentation type.

7. A storage medium encoded with instructions, wherein the instructions when executed comprise:
   receiving a plurality of states associated with a plurality of respective processes, wherein data associated with the plurality of processes are displayed in a plurality of respective windows;
   displaying a plurality of identifiers of the respective processes and the plurality of states in a stacked cursor;
   customizing the displaying based on a presentation type associated with each of the processes;
   moving the stacked cursor in response to movement of a pointing device; and
   removing the identifier and the state from the stacked cursor if a time threshold associated with the respective process expires and the state indicates that the respective process is ready.

8. The storage medium of claim 7, wherein the customizing further comprises:
   displaying the state in the stacked cursor in a text form indicated by the respective presentation type.

9. The storage medium of claim 7, wherein the customizing further comprises:
   displaying the state in the stacked cursor in an icon form indicated by the respective presentation type.

10. The storage medium of claim 7, wherein the customizing fhrther comprises:
    displaying the identifier in the stacked cursor in a text form indicated by the respective presentation type.

11. The storage medium of claim 7, wherein the customizing further comprises:
    displaying the identifier in the stacked cursor in an icon form indicated by the respective presentation type.

12. The medium of claim 7, wherein the customizing further comprises:
    displaying the identifier and the state in the stacked cursor in a color indicated by the respective presentation type.

13. The storage medium of claim 7, wherein the customizing farther comprises:
    in response to a change of the state, presenting a sound indicated by the respective presentation type.

14. A method for configuring a computer, comprising:
    configuring the computer to receive a plurality of states associated with a plurality of respective processes, wherein data associated with the plurality of processes are displayed in a plurality of respective windows;
    configuring the computer to display a plurality of identifiers of the respective processes and the plurality of states in a stacked cursor; configuring the computer to customize the displaying based on a presentation type associated with each of the processes;
    configuring the computer to move the stacked cursor an amount and direction proportional to movement of a cursor, wherein the cursor is moved in response to movement of a pointing device and the cursor represents an selection point in one of the plurality of windows; and
    configuring the computer to remove the identifier and the state from the stacked cursor if a time threshold associated with the respective process expires and the state indicates that the respective process is ready.

15. The method of claim 14, wherein the configuring the computer to customize further comprises:
    configuring the computer to display the state in the stacked cursor in a text form indicated by the respective presentation type.

16. The method of claim 14, wherein the configuring the computer to customize further comprises:
    configuring the computer to display the state in the stacked cursor in an icon form indicated by the respective presentation type.

17. The method of claim 14, wherein the configuring the computer to customize further comprises:
    configuring the computer to display the identifier in the stacked cursor in a text form indicated by the respective presentation type.

18. The method of claim 14, wherein the configuring the computer to customize further comprises:
    configuring the computer to display the identifier in the stacked cursor in an icon form indicated by the respective presentation type.

19. The method of claim 14, wherein the configuring the computer to customize further comprises:
    configuring the computer to display the identifier and the state in the stacked cursor in a color indicated by the respective presentation type.

* * * * *